(12) United States Patent
Straßer

(10) Patent No.: US 11,110,814 B2
(45) Date of Patent: Sep. 7, 2021

(54) CHARGING DEVICE FOR ELECTRIC VEHICLES

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 183 days.

(21) Appl. No.: 16/511,387

(22) Filed: Jul. 15, 2019

(65) Prior Publication Data

US 2020/0039374 A1 Feb. 6, 2020

(30) Foreign Application Priority Data

Aug. 2, 2018 (DE) .......................... 102018212927.4

(51) Int. Cl.
 *B60L 53/62* (2019.01)
 *B60L 53/18* (2019.01)
 *H02J 7/00* (2006.01)

(52) U.S. Cl.
 CPC .............. *B60L 53/62* (2019.02); *B60L 53/18* (2019.02); *H02J 7/0027* (2013.01)

(58) Field of Classification Search
 CPC .......... B60L 53/62; B60L 53/18; H02J 7/0027
 USPC ....................................................... 320/109
 See application file for complete search history.

(56) References Cited

U.S. PATENT DOCUMENTS

| | | | | |
|---|---|---|---|---|
| 8,798,900 B2 * | 8/2014 | Onogi | ...................... | B60L 58/16 701/123 |
| 8,823,486 B2 * | 9/2014 | Jung | ........................ | B60L 53/16 340/5.6 |
| 8,981,718 B2 * | 3/2015 | Catty | ....................... | B60L 53/68 320/109 |
| 9,783,185 B2 * | 10/2017 | Zhou | ........................ | B60L 58/21 |
| 9,908,421 B2 * | 3/2018 | Koolen | ................... | B60L 53/31 |
| 9,969,286 B2 * | 5/2018 | Jiang | ..................... | B60L 53/305 |
| 10,615,611 B2 * | 4/2020 | Jeon | ........................ | H02J 7/0018 |
| 10,666,062 B2 * | 5/2020 | Greening | ................. | H02J 7/00 |
| 10,744,883 B2 * | 8/2020 | Quattrini, Jr. | ........... | B60L 53/65 |
| 10,790,690 B2 * | 9/2020 | Yang | ..................... | H02J 7/0091 |
| 10,862,306 B2 * | 12/2020 | Gra l | ....................... | B60L 55/00 |
| 10,913,372 B2 * | 2/2021 | Baxter | .................... | B60L 53/65 |
| 10,926,657 B2 * | 2/2021 | Schlaudraff | ............. | B60L 53/68 |
| 10,926,659 B2 * | 2/2021 | Lee | ......................... | B60L 53/66 |
| 2012/0200256 A1 | 8/2012 | Tse | | |
| 2013/0057209 A1 | 3/2013 | Nergaard et al. | | |
| 2013/0069592 A1 | 3/2013 | Bouman | | |
| 2014/0320083 A1 | 10/2014 | Masuda et al. | | |
| 2017/0274792 A1 | 9/2017 | Vaughan et al. | | |

FOREIGN PATENT DOCUMENTS

| | | |
|---|---|---|
| DE | 102011008676 A1 | 7/2012 |
| DE | 102015114002 A1 | 3/2017 |
| WO | 2013/017161 A1 | 2/2013 |

OTHER PUBLICATIONS

German Examination Report dated May 22, 2019 in corresponding German Application No. 10 2018 212 927.4; 19 pages.

* cited by examiner

*Primary Examiner* — Suresh Memula

(74) *Attorney, Agent, or Firm* — Maier & Maier, PLLC

(57) ABSTRACT

A charging device for electric vehicles, with multiple charging points, to each of which an electric vehicle can be connected, and with multiple power electronics units each providing a maximum charging power, and a method for charging an electric vehicle.

9 Claims, 2 Drawing Sheets

CHARGING DEVICE FOR ELECTRIC VEHICLES

FIELD

The disclosure relates to a charging device for electric vehicles, with multiple charging points, to each of which an electric vehicle can be connected, and with multiple power electronics units each providing a maximum charging power. The invention moreover relates to a method for charging an electric vehicle.

BACKGROUND

A conventional charging device for an electric vehicle comprises a power electronics unit (LE) which is connected to a power grid of a local electricity provider, a control device connected to the power electronics unit for controlling the power electronics unit, and a charging cable connected to the power electronics unit, to which the electric vehicle can be connected. Such a charging device can be designed, for example, in the form of a so-called charging station.

The power electronics unit of the charging device is designed in such a manner that it provides a predetermined maximum charging power for a connected electric vehicle, which in turn must be provided by the power grid of the local electricity provider. However, at the site of the charging device, the electricity provider always makes available a certain limited maximum power, and exceeding this maximum power can entail a major negative disturbance of the power grid.

Current electric vehicles are designed for a maximum charging power of up to 400 kW. However, it is to be expected that in the future electric vehicles will be designed for higher charging powers of 600 kW, 1000 kW or more.

When multiple conventional charging stations are arranged adjacently to one another, for example, at a parking space, the maximum power provided by the power grid can be insufficient for simultaneously connecting an electric vehicle to each charging station and simultaneously operating the charging stations at full load. Consequently, a charging device with several charging stations must additionally comprise a device for power limitation in order to protect the power grid from overloading.

WO 2013 017 161 A1 discloses a charging device and a corresponding method for charging electric vehicles. The charging device comprises multiple charging stations and a control device connected to the charging stations, which is configured to communicate with an electric vehicle in order to receive an identification feature of the electric vehicle. Based on the identification feature, the control device determines a reference charging curve of the electric vehicle, which is stored in the control device, and it predicts a charging profile for the electric vehicle. If several charging stations at a time have a respective electric vehicle connected, the control device, if necessary, reduces the respective charging powers in such a manner that a total charging power at no time exceeds a maximum power provided by the power grid.

DE 10 2011 008 676 A1 discloses another charging device and a corresponding method for charging electric vehicles. The charging devices comprises multiple charging stations and a control device connected to the charging stations, which is configured to communicate with a charging device of an electric vehicle to be charged, in order to receive a charging profile of a vehicle battery of the electric vehicle which is to be charged. If several charging stations at a time have a respective electric vehicle connected, the control device controls the corresponding charging processes based on the received charging profiles in such a manner that a total charging power at no time exceeds a maximum power provided by the power grid. Here, in particular, the sequence of the connection of the electric vehicles is taken into consideration.

Yet another charging device and a corresponding method for charging electric vehicles are disclosed by DE 10 2015 114 002 A1. The charging device comprises multiple charging stations and a control device connected to the charging stations, which is configured to communicate with an electric vehicle to be charged, in order to receive a charging status of a vehicle battery to be charged and a plan of action of the electric vehicle, and to calculate a charging profile for the electric vehicle based on the charging status and the plan of action. If several charging stations at a time have a respective electric vehicle connected, the control device controls the corresponding charging processes based on the calculated charging profiles in such a manner that a total charging power at no time exceeds a maximum power of the power grid.

Each of the above-mentioned solutions requires communication of the control device of the charging device with control devices of electric vehicles connected thereto. Thereby, the complexity of the charging device—and of the electric vehicles—is increased. In addition, the control device of the charging device must be configured for a universal charging procedure in order to be able to charge electric vehicles even without the necessary communication capability.

A substantial disadvantage consists in that each charging station must have a power electronics unit designed for the maximum power, by means of which partially discharged electric vehicles or electric vehicles with low charging power can the also be charged. Irrespective of this, frequently not all the charging stations of a charging device are simultaneously connected to electric vehicles. Consequently, the device must be overdesigned, which is associated with correspondingly high costs and unnecessarily tied capital.

Furthermore, an electric vehicle connected to a charging station and already fully charged blocks the power electronics unit of the charging station unnecessarily, until the vehicle is disconnected and removed from the charging station. This can be the case when a driver of the electric vehicle is prevented from picking up the electric vehicle immediately after the end of the charging process, for example because he/she is engaged in a purchase, a (business) meal, an appointment with a physician or a sports activity such as skiing.

Therefore, the underlying aim of the invention is to create an improved charging device for electric vehicles, which avoids the mentioned disadvantages. In addition, the aim of the invention is to indicate a method for charging electric vehicles.

SUMMARY

The invention relates to a charging device for electric vehicles, with multiple charging points, to each of which an electric vehicle can be connected, and with multiple power electronics units each providing a maximum charging power. A charging point or terminal is understood to mean a device to which an electric vehicle can be connected by means of a charging cable or in another manner, for example, inductively.

The charging device according to the invention comprises a central control unit which is configured to connect a power electronics unit to a changing point and to disconnect it from the charging point. Accordingly, no static association exists between a power electronics unit and a charging point. Instead, the association is made dynamically by the control device. For this purpose, the power electronics units are advantageously arranged in a spatially central manner and at a distance from the charging point.

In a preferred embodiment, the control unit is configured to connect the power electronics unit and to disconnect it from the charging point depending on a necessary charging power of an electric vehicle connected to the charging point. In other words, the power electronics unit can be connected to the charging point only temporarily during a charging process, for example, at the beginning of the charging process, and can be disconnected from the charging process when it is no longer necessary, for example, after the end of the charging process. The power electronics unit which is then disconnected is immediately available for charging another electric vehicle.

Advantageously, the control unit is configured to connect the power electronics unit alternatingly to multiple charging points to each of which an electric vehicle is connected. In this manner, the charging electronics unit can participate successively and/or alternatingly in the simultaneous charging of multiple electric vehicles. A special application case for this embodiment occurs when multiple electric vehicles are connected simultaneously with maximum charging power to the charging device, but the maximum power of the power grid made available is not sufficient for simultaneous charging of all the connected electric vehicles. Then, different subsets of the connected electric vehicles can be charged successively or alternatingly each with maximum charging power. In other words, the maximum charging power is made available to each individual electric vehicle only temporarily.

In additional embodiments, at least one power electronics unit, in particular each power electronics unit, provides a maximum charging power which is lower than a maximum charging power necessary for charging an electric vehicle. The power electronics unit with a lower charging power offers a fine granularity and enables a precise setting of the power provided at a charging point, whereby the charging device is highly flexible in application and it is equally well suited for different electric vehicles with different charging power need without overdesign.

In advantageous embodiments, the provided maximum charging of all the power electronics units is identical. Thereby, the management of the power electronics units is simplified for the control device. Alternatively, the power electronics units can also provide different maximum charging powers, in order to enable the control device to have a more precise adaptation to the respective necessary charging powers when the power electronics units are connected to the charging points. This moreover makes it possible to further reduce the need for overdesign of the charging device.

In preferred embodiments, multiple electronics units can be or are connected to the charging point. Multiple power electronics units with lower power can together provide a high necessary charging power. It is also possible to dynamically adapt the number of power electronics units to the respective currently necessary charging power during the charging process.

The invention further relates to a method for charging an electric vehicle, wherein an electric vehicle is connected to a charging point of a charging device.

In the method according to the invention, a power electronics unit of the charging device is connected to the charging point by a control unit of the charging device for charging the electric vehicle, and the power electronics unit is disconnected from the charging point after the charging. In contrast to a static association, the power electronics unit can at any time be connected to and disconnected from the control unit.

In some embodiments, the power electronics unit is connected to and disconnected from the charging point by the control unit depending on a necessary charging power of the electric vehicle. In this manner, the charging power is made available in a demand-appropriate manner at all times.

In a preferred embodiment, multiple electric vehicles are connected to a respective charging point, and the power electronics unit is alternatingly connected to the charging points by the control unit. In other words, for each electric vehicle, the respective necessary charging power is provided only temporarily. This embodiment is advantageous if multiple electric vehicles are simultaneously connected to charging points of the device, but the provided maximum power of the electric power grid is not sufficient for simultaneously charging all the connected electric vehicles.

BRIEF DESCRIPTION OF THE DRAWINGS

The invention is represented diagrammatically in the drawings in reference to embodiments and described in further detail in reference to the drawings.

DETAILED DESCRIPTION

Figure 1:
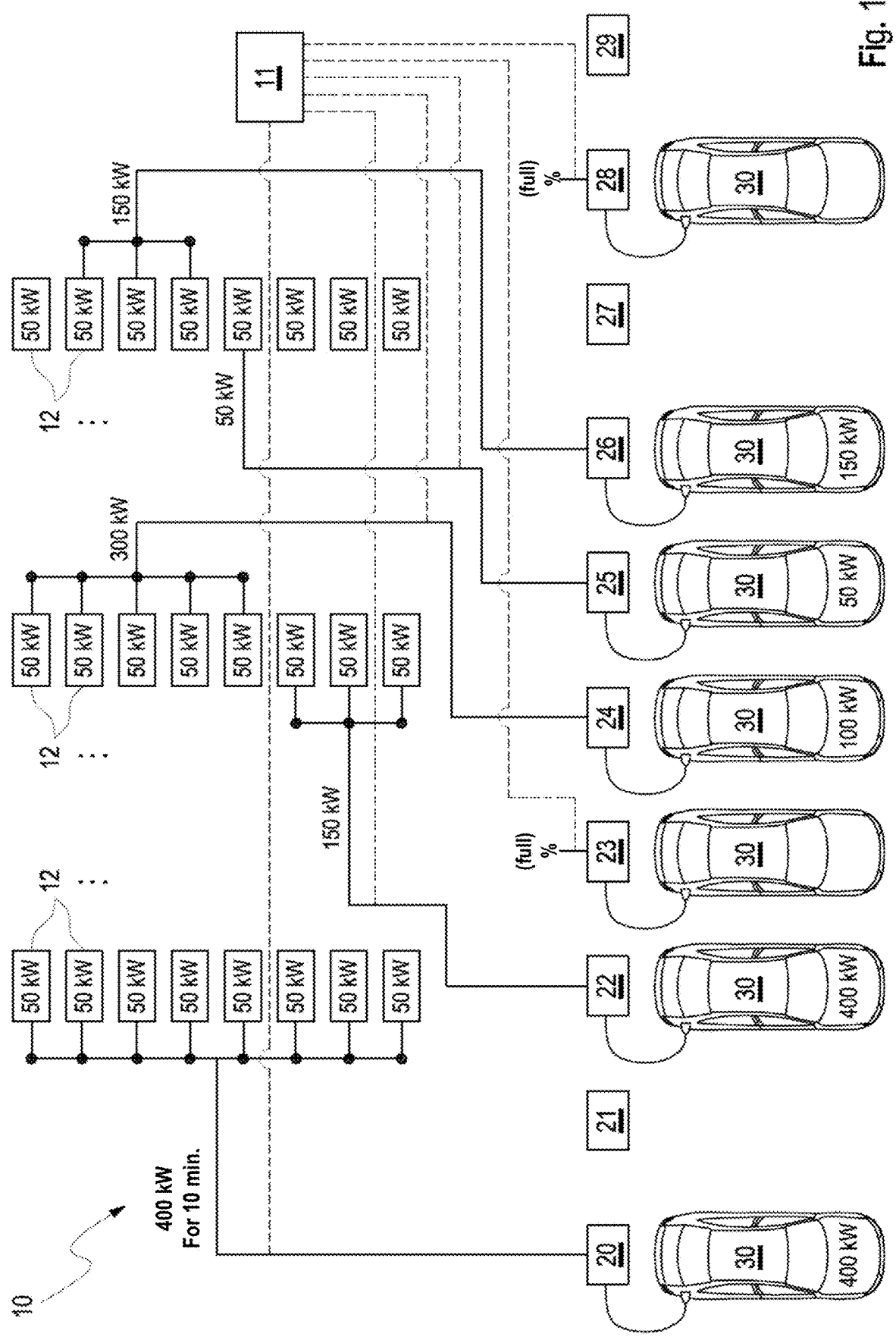
FIG. 1 shows a block diagram of an embodiment of the charging device according to the invention in a diagrammatic representation.

FIG. 1 shows a block diagram of an embodiment of the charging device 10 according to the invention for electric vehicles 30 in a diagrammatic representation. The charging device 10 comprises a number of ten charging points 20-29 to each of which an electric vehicle 30 can be connected.

The charging device 10 moreover comprises a plurality of a total number of twenty-four power electronics units 12 which are centrally arranged, i.e., they are not spatially associated with the individual charging points 20-29. The provided maximum charging power of all the power electronics units 12 is identical. Each power electronics unit 12 provides a maximum charging power which is less than a maximum charging power necessary for charging an electric vehicle 30 and, in the present case, is 50 kW, so that a provided total charging power of the charging device is 1200 kW.

In comparison to conventional charging devices which, in the case of ten charging stations each having a maximum charging power of 400 kW, comprise power electronics units for a total of 4000 kW, in the charging device 10 according to the invention, for example, there is a saving of fifty-six power electronics units 12 with a total charging power of 2800 kW.

The charging device moreover comprises a central control unit 11 which is configured to connect one or more power electronics units 12 to a charging point 20-29 and to disconnect them from the charging point 20-29. The control unit is moreover configured to connect the power electronics unit 12 to the charging point 20-29 and disconnect it from the charging point 20-29 depending on a necessary charging power of an electric vehicle 30 connected to the charging point 20-29. In addition, the control unit 11 is configured to connect the power electronics unit 12 alternatingly to multiple charging points 20-29 to each of which an electric vehicle 30 is connected.

To the charging point 20, an electric vehicle 30 with a maximum charging power of 400 kW is connected by means of a charging cable and is charged for 10 minutes with a charging power of 400 kW. For this purpose, eight power electronics units 12 are connected to the charging point 20.

To the charging point 22, an electric vehicle 30 with a maximum charging power of 400 kW is connected and charged with a charging power of 150 kW. For this purpose, three power electronics units 12 are connected to the charging point 22.

To the charging points 23, 28, a respective electric vehicle 30 is connected by means of a charging cable, the vehicle being already fully charged. Accordingly, each charging electronics unit 12 is disconnected from the charging points 23, 28.

To the charging point 24, an electric vehicle 30 with a maximum charging power of 400 kW is connected by means of a charging cable and is charged with a charging power of 300 kW. For this purpose, six power electronics units 12 are connected to the charging point 24.

To the charging point 25, an electric vehicle 30 with a maximum charging power of 50 kW is connected by means of a charging cable and is charged with a charging power of 50 kW. For this purpose, one power electronics unit 12 is connected to the charging point 25.

To the charging point 26, an electric vehicle 30 with a maximum charging power of 150 kW is connected by means of a charging cable and is charged with a charging power of 150 kW. For this purpose, three power electronics units 12 are connected to the charging point 26.

The charging points 21, 27, 29 are free, i.e., no electric vehicle is connected to them. Accordingly, each power electronics unit 12 is disconnected from the charging points 21, 27, 29.

During the operation of the charging device 10, the electric vehicles 30 are connected to the charging points 20, 22-26, 28. One or more power electronics units 12 of the charging device 10 for charging the electric vehicles 30 are connected to the charging points 20, 22-26, 28 and are disconnected from the charging points 20, 22-26, 28 by the control unit 11 of the charging device 10 depending on the charging power necessary for the respective electric vehicle 30. When the charging device 10 does not provide enough power electronics units 12 for electric vehicles connected to the charging points 20-29, one or more power electronics units 12 are alternatingly connected to the charging points 20-29 by the control unit 11.

Figure 2:
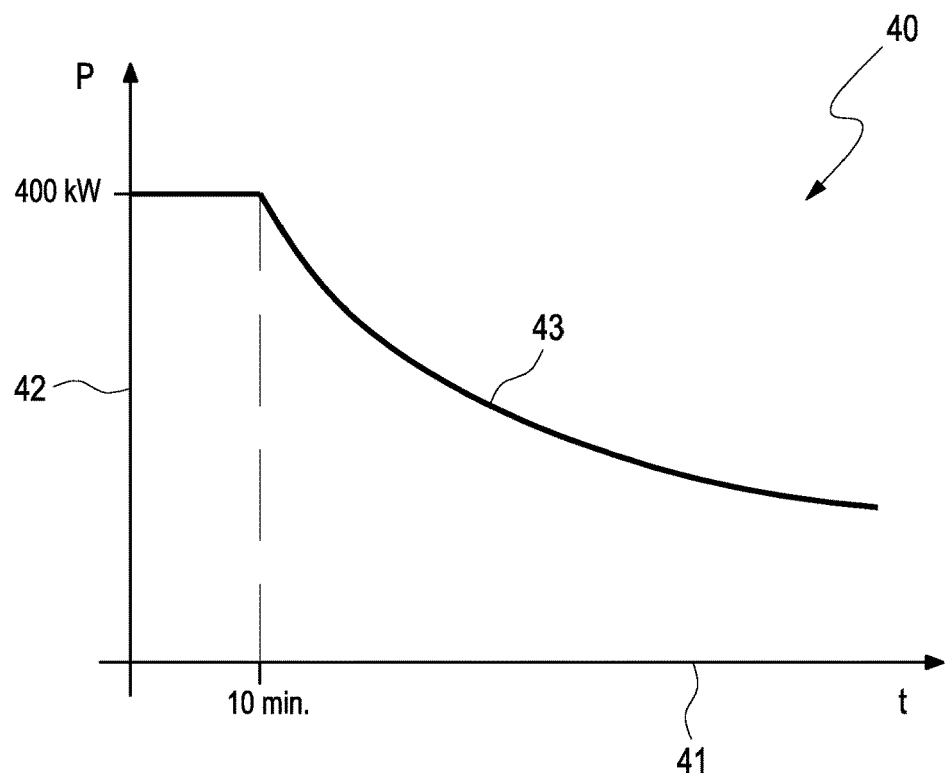
FIG. 2 shows a time curve of a charging power of a discharged vehicle battery in a function graph.

FIG. 2 shows a time curve of a charging power of a discharged vehicle battery in a function graph 40. On the abscissa 41, a time t is plotted in minutes, and on the ordinate 42 a charging power P is plotted in kW. The drawn charging curve 43 indicates that for 10 minutes the charging occurs with a maximum charging power P of 400 kW. This charging curve thus corresponds to the electric vehicle 30 connected to charging point 20, as shown in FIG. 1. Accordingly, the charging power P is successively lowered.

Figure 3:
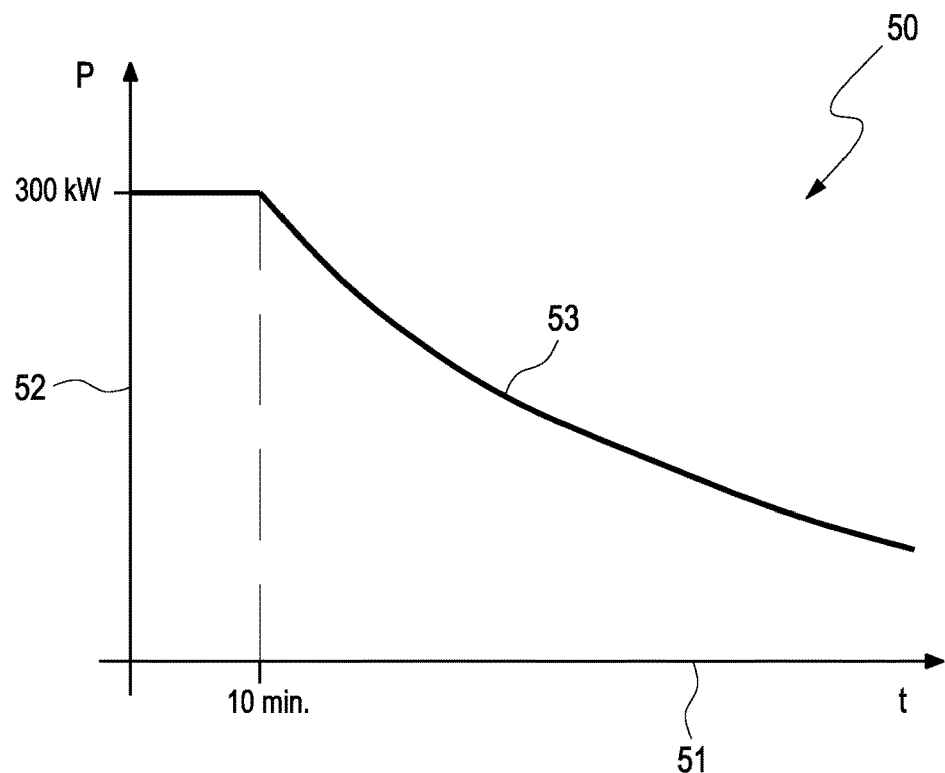
FIG. 3 shows a time curve of a charging power of a partially discharged vehicle battery in a function graph.

FIG. 3 shows a time curve of a charging power of a partially discharged vehicle battery in a function graph 50. On the abscissa 51, a time t is plotted in minutes, and on the ordinate 52 a charging power P is plotted in kW. The charging curve 53 drawn indicates that charging with a maximum charging power P of 300 kW occurs for 10 minutes. This charging curve could correspond to an electric vehicle whose vehicle battery is only partially discharged at the beginning of the charging process.

An essential advantage of the charging device according to the invention consists in that an overdesign of an individual charging point is avoided. Instead, one or more power electronics units can be connected to the individual charging point in accordance with the demand, when an electric vehicle is connected to the charging point.

The invention claimed is:

1. A charging device for electric vehicles, comprising:
multiple charging points, to each of which an electric vehicle can be connected; multiple power electronics units each providing a maximum charging power; and control unit which is configured to connect a respective power electronics unit to a charging point and disconnect the respective power electronics unit from the charging point,
wherein the control unit is configured to connect to and disconnect from each charging point one or more of the multiple power electronics units depending on a necessary charging power of an electric vehicle connected to one of the multiple charging points,
wherein the maximum charging power of at least one of the multiple power electronics units differs from another of the multiple power electronics units,
wherein, in a case in which multiple electric vehicles are connected to the charging device with a collective power draw exceeding an available power of the charging device, the control unit successively cycles connection of the multiple power electronics units to the multiple charging points such that each electric vehicle is charged at a maximum rate only temporarily.

2. The charging device according to claim 1, wherein the control unit is configured to connect the respective charging electronics unit alternatingly to multiple charging points, to each of which an electric vehicle is connected.

3. The charging device according to claim 2, wherein the at least one power electronics unit of the multiple power electronics units provides a maximum charging power which is less than a maximum necessary charging power for charging an electric vehicle.

4. The charging device according to claim 2, wherein multiple power electronics units can be connected or are connected to the charging point.

5. The charging device according to claim 1, wherein the at least one power electronics unit of the multiple power electronics units provides a maximum charging power which is less than a maximum necessary charging power for charging an electric vehicle.

6. The charging device according to claim 5, wherein multiple power electronics units can be connected or are connected to the charging point.

7. The charging device according to claim 1, wherein multiple power electronics units can be connected or are connected to the charging point.

8. A method for charging an electric vehicle, comprising:
connecting an electric vehicle a charging point of a charging device,
connecting, by a control unit of the charging device, at least one power electronics unit of the charging device to the charging point for charging the electric vehicle, and
disconnecting, by the control unit, the at least one power electronics unit from the charging point after charging is complete,
wherein the control unit is configured to connect to and disconnect from the charging point the at least one power electronics unit depending on a necessary charging power of the electric vehicle,
wherein the charging device is provided with multiple power electronics units and a maximum charging power of a first of the multiple power electronics units differs from that of a second of the multiple power electronics units,
wherein, in a case in which multiple electric vehicles are connected to the charging device with a collective power draw exceeding an available power of the charging device, the control unit successively cycles connection of the multiple power electronics units such that each electric vehicle is charged at a maximum rate only temporarily.

9. The method according to claim 8, wherein the multiple electric vehicles are each connected to a charging point, and the at least one power electronics unit is alternatingly connected to the charging points by the control unit.

* * * * *